United States Patent
Shivarama et al.

(10) Patent No.: US 11,495,253 B1
(45) Date of Patent: Nov. 8, 2022

(54) GIMBAL TEST SYSTEM

(71) Applicant: Seagate Technology LLC, Cupertino, CA (US)

(72) Inventors: Ravishankar Ajjanagadde Shivarama, Eden Prairie, MN (US); Bradley J. Ver Meer, Savage, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 16/193,104

(22) Filed: Nov. 16, 2018

Related U.S. Application Data

(60) Provisional application No. 62/587,540, filed on Nov. 17, 2017.

(51) Int. Cl.
*G11B 5/455* (2006.01)
*G11B 5/48* (2006.01)

(52) U.S. Cl.
CPC .............. *G11B 5/455* (2013.01); *G11B 5/483* (2015.09); *G11B 5/4853* (2013.01)

(58) Field of Classification Search
None
See application file for complete search history.

(56) References Cited

U.S. PATENT DOCUMENTS

| | | | |
|---|---|---|---|
| 5,049,813 A | 9/1991 | Van Loan et al. | |
| 7,099,118 B2 | 8/2006 | Hutchinson et al. | |
| 8,699,186 B1* | 4/2014 | Hahn et al. | G11B 5/4873 360/244.9 |
| 9,013,963 B2 | 4/2015 | Ver Meer et al. | |
| 9,111,559 B1* | 8/2015 | Hahn et al. | G11B 5/483 |
| 9,171,561 B1 | 10/2015 | Gadbois et al. | |
| 2008/0247131 A1* | 10/2008 | Hitomi et al. | G06F 1/182 361/600 |
| 2009/0190263 A1* | 7/2009 | Miura et al. | G11B 5/4853 360/245.8 |
| 2011/0141624 A1* | 6/2011 | Fuchino et al. | G11B 5/4873 360/244.2 |
| 2012/0014017 A1* | 1/2012 | Ohnuki et al. | G11B 5/486 360/294.1 |
| 2012/0162901 A1* | 6/2012 | Miura | G11B 5/486 361/679.33 |

* cited by examiner

*Primary Examiner* — Craig A. Renner
(74) *Attorney, Agent, or Firm* — Hall Estill Attorneys At Law

(57) ABSTRACT

A data storage system may utilize a gimbal test system to find open circuits and short circuits in a head gimbal assembly. The gimbal test system can have a gimbal flexure suspended between a load beam and a data storage medium with a flex circuit physically attached to the gimbal flexure to electrically connect a transducing head to a controller. The flex circuit can be tested with a test via that continuously extends through the flex circuit to a probe portion and a test pad located on an air bearing side of the gimbal flexure. The probe portion can be backed by the gimbal flexure along a plane perpendicular to a recording surface of the data storage medium.

20 Claims, 4 Drawing Sheets

GIMBAL TEST SYSTEM

RELATED APPLICATION

The present application makes a claim of domestic priority to U.S. Provisional Patent Application No. 62/587,540 filed Nov. 17, 2017, the contents of which are hereby incorporated by reference.

SUMMARY OF THE INVENTION

A gimbal test system, in accordance with some embodiments, has a gimbal flexure suspended between a load beam and a data storage medium with a flex circuit physically attached to the gimbal flexure to electrically connect a transducing head to a controller. The flex circuit is tested with a test via that continuously extends through the flex circuit to a probe portion and a test pad located on an air bearing side of the gimbal flexure. The probe portion is backed by the gimbal flexure along a plane perpendicular to a recording surface of the data storage medium.

Various embodiments configure a transducing head suspension with a microactuator attached to a gimbal flexure between the gimbal flexure and a load beam. A flex circuit is physically connected to the microactuator and an air bearing side of the gimbal flexure while electrically connecting the microactuator to a controller. A first test via that continuously extends through the flex circuit to a first probe portion and first test pad located on the air bearing side of the flex circuit allows the microactuator to be tested. The first test via is electrically connected to the microactuator and the first probe portion is backed by the gimbal flexure along a plane perpendicular to a recording surface of a data storage medium.

In other embodiments, a gimbal test system suspends a gimbal flexure from a load beam and physically positions a flex circuit on the gimbal flexure between the gimbal flexure and a data storage medium. Connecting a transducing head to a controller via the flex circuit allows the flex circuit to be tested with a probe positioned on an air bearing side of the gimbal flexure. The probe contacts a probe portion of a test via of the flex circuit with the test via continuously extending through the flex circuit from a first contact pad located on a load beam side of the flex circuit to a second contact pad located on the air bearing side of the flex circuit. The probe portion is backed by the gimbal flexure along a plane perpendicular to a recording surface of the data storage medium.

DETAILED DESCRIPTION

The types of data being stored in data storage systems, particularly on hard disk drives with rotating data storage media, are becoming increasingly important. That is, stored data often involves more sensitive information, such as personal information, financial information, captured images, and passwords, than in previous years where stored data often contained very little personal information. For instance, medical records are often stored electronically now, compared with paper files of the past, and contain personal information that would be unfortunate to lose.

The increase in data importance has emphasized the reliability of data storage components. The fact that some types of data memory, such as flash and volatile memories, expectedly lose stored data, the reliability of hard disk drive data storage components has become even more emphasized by consumers and assorted industries. An ongoing push for higher data storage capacity in hard disk drives has resulted in heightened component testing to ensure proper hard disk drive function upon reaching an end-user. However, modern testing systems can limit the structural possibilities of hardware components that can enhance data storage performance and data storage capacity.

With these issues in mind, various embodiments are directed to data storage systems with at least one data storage device having a gimbal test system that places fewer structural limitations components that access data while allowing for robust and efficient testing of electrical interconnections of a head gimbal assembly of a data storage device. The ability to position electrical components in locations within a data storage device without concern for the testing capabilities of the component allows a data storage device to be configured for maximum performance and reliability.

Figure 1:
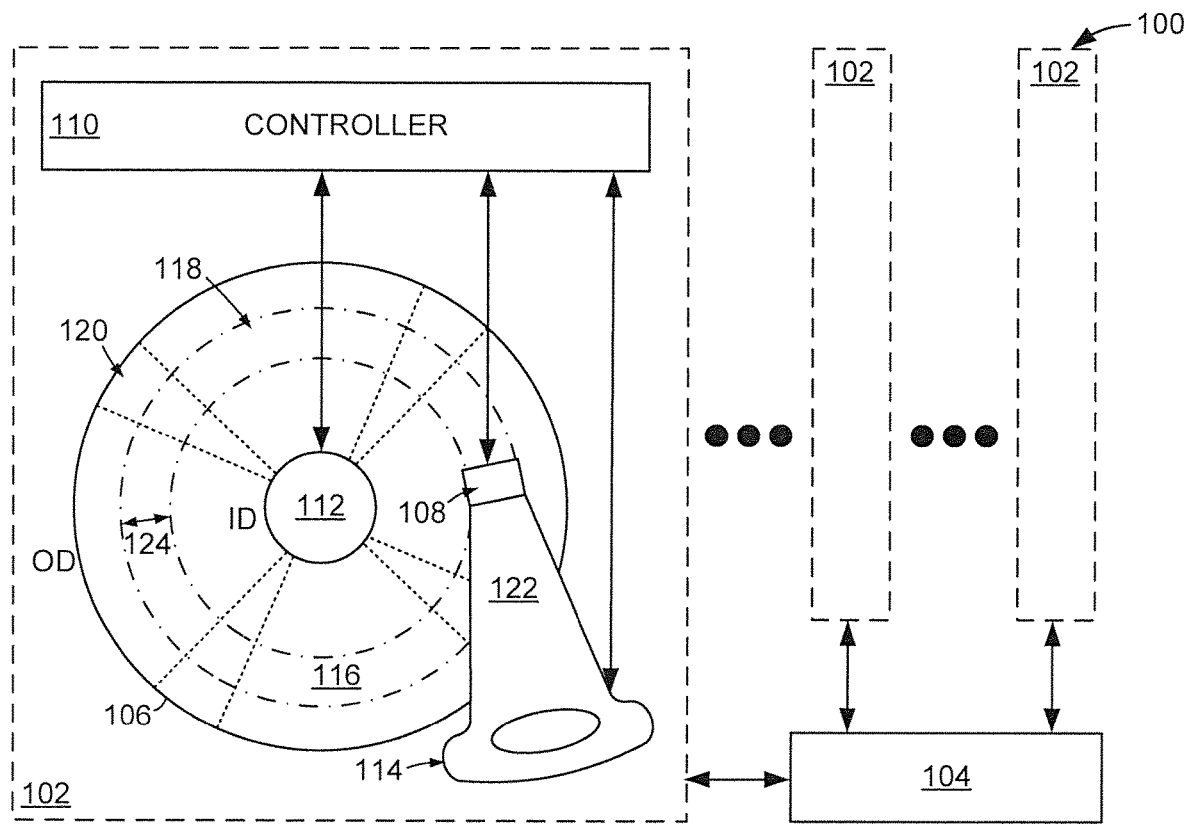
FIG. 1 represents portions of an example data storage system arranged in accordance with various embodiments.

FIG. 1 displays ports of an example data storage system 100 in which various embodiments can be practiced. The data storage system 100 can consist of any number, and types, of data storage devices 102 that operate individually and collectively as directed by a system controller 104 that may be physically separate from the constituent data storage devices 102.

Although the data storage devices 102 of the system 100 can be different types of data storage, such as solid-state memory or a hybrid of several different kinds of memory, at least one data storage device 102 is configured as a hard disk drive that has one or more rotating magnetic data storage media 106 accessed by at least one transducing head 108. A local controller 110, such as a programmable circuit or microprocessor, can direct data access operations to, and from, the data storage media 106 alone, or in combination with the system controller 104.

The local controller 110 can direct a spindle motor 112 to spin the data storage media 106 at various rotational velocities while a voice coil motor 114 articulates the transducing head 108 over a selected data track 116 portion of the media 106 to conduct data access operations, such as data reading and data writing. As shown, the data storage media 106 can be organized into user data sections 118 and servo data sections 120 where device data, such as repeated runout and grey code, is stored.

By positioning the transducing head 108 proximal a selected data track 116, the local controller 106 can efficiently conduct data access operations in combination with evaluations from the servo data sections 120 that correct transducing head 108 deviations from prescribed data access operations. It is noted that due to the fixed pivot point of the voice coil motor 114 relative to the transducing head 108, the alignment of the transducing head 108 varies from the inner diameter (ID) of the media 106 to the outer diameter (OD) of the media 108. Such skew angle can correspond with some data tracks 116 having higher risk of data access errors due to the transducing head 108 being misaligned with the track 116.

Hence, some embodiments attach the transducing head 108 to a suspension 122 that can provide precise transducing head 108 motion that can compensate for skew angle effects and increase the accuracy. However, the incorporation of transducing head 108 articulating features can add structural and electrical complexity. Such complexity can be particularly problematic in suspension 122 configurations directed to increase the areal data density of the data storage media 106 by decreasing the data track width 124 and/or increasing the data track density. Accordingly, various embodiments are directed to arranging a transducing head suspension 122 to incorporate accurate lateral motion features without eliminating structural features of the suspension 120 that allows for electrical testing.

Figure 2:
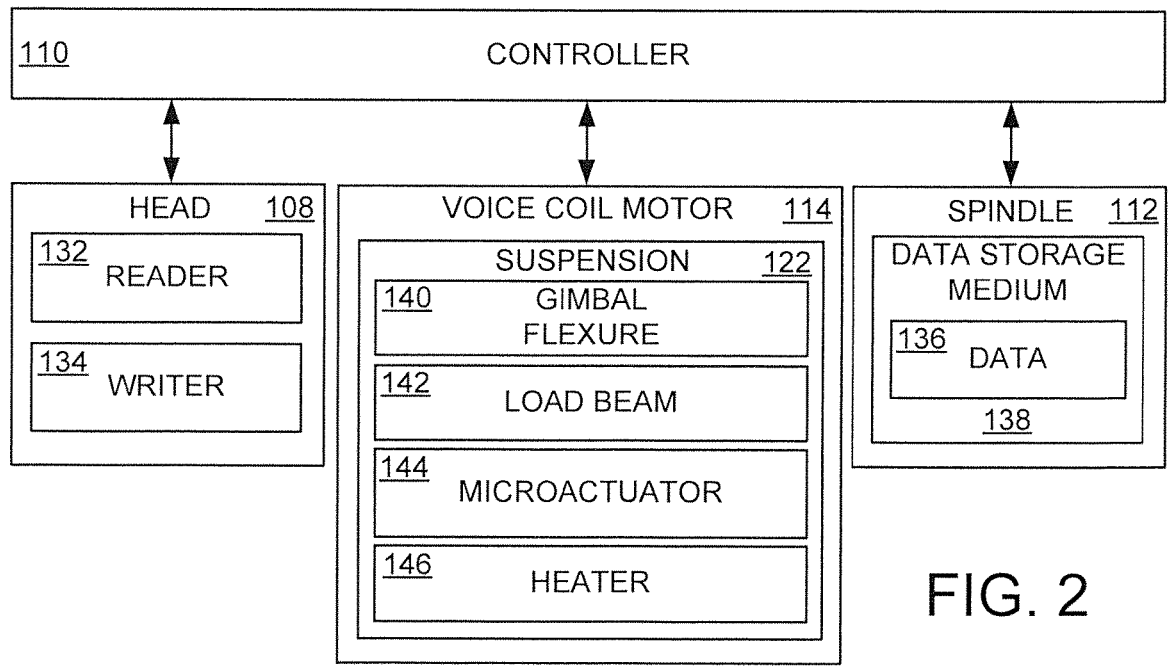
FIG. 2 displays a block representation of portions of an example data storage device capable of being utilized in the data storage system of FIG. 1.

FIG. 2 depicts a block representation of an example data storage device 130 that may be utilized in the data storage system 100 of FIG. 1 in accordance with assorted embodiments. The data storage device 130 has a local controller 110 that is concurrently electrically connected to a transducing head 108, a voice coil motor 114, and a spindle motor 112.

As shown, the transducing head 108 can consist of at least a data reader 132 and a data writer 134 that can independently and concurrently operate to read data 136 from, and write data 136 to, an adjacent data storage medium 138 rotated by the spindle motor 112 at a speed dictated by the controller 110. The voice coil motor 114 provides structural support for the transducing suspension 122 on which the transducing head 108 is affixed, as shown in FIG. 1. The transducing suspension 122 can consist of a gimbal flexure 140 mounted to a load beam 142.

The gimbal flexure 140 can have microactuator 144 and/or heater 146 features that can provide small resolution positional adjustments for the transducing head 108 relative to the underlying data storage medium 138. For example, the microactuator feature 144 can articulate portions of the gimbal flexure 140 and the transducing head 108 in a plane parallel to a recording surface of the data storage medium 138 and the heater feature 146 articulates the transducing head 108 in a plane perpendicular to the recording surface of the data storage medium 138.

Figure 3:
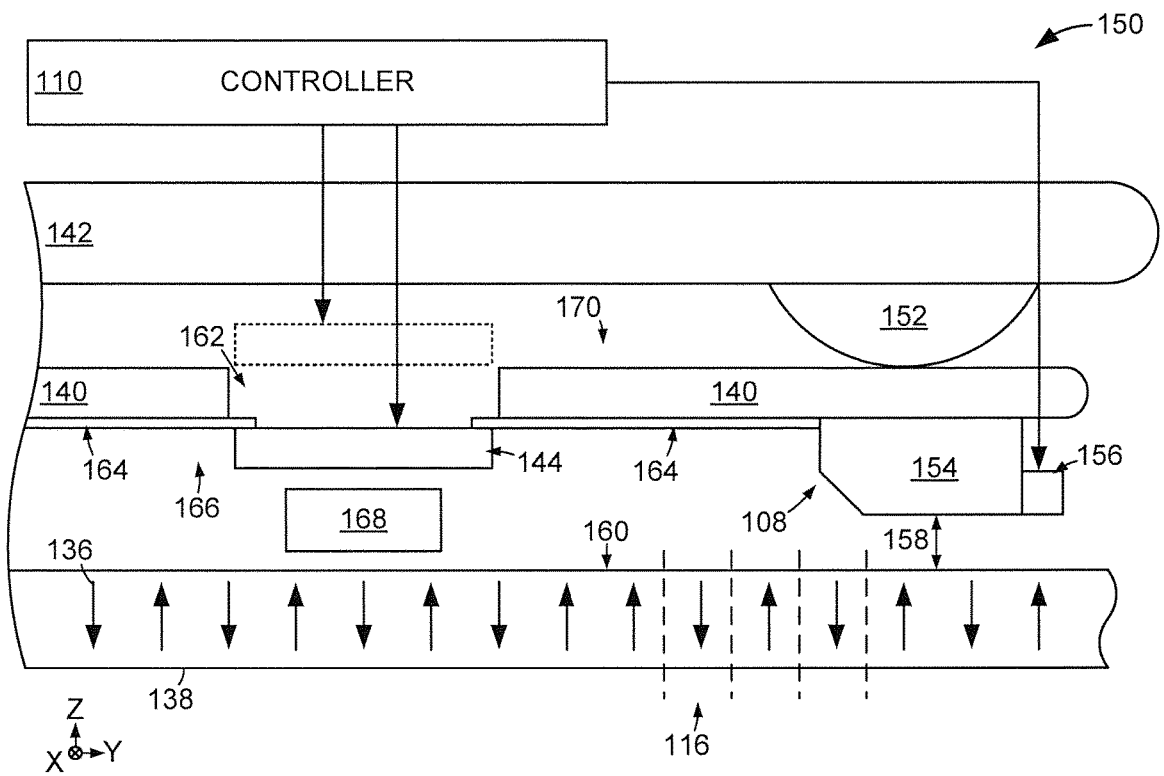
FIG. 3 depicts a cross-sectional line representation of portions of an example data storage device arranged in accordance with assorted embodiments.

FIG. 3 illustrates a line representation of a portion of an example data storage device 150 capable of being utilized in the data storage system 100 of FIG. 1. The cross-sectional view of FIG. 3 shows how a gimbal flexure 140 can be positioned between a load beam 142 and a data storage medium 138. The gimbal flexure 140 can be rigidly attached to the load beam 142 along with a physical connection via a dimple 152 that promotes accurate pitch and roll motion by the transducing head 108.

While not required or limiting, the transducing head 108 can consist of an air bearing slider 154 that supports a transducing region 156 where the data reader 132 and data writer 134 are located. It is noted that the load beam 142 and gimbal flexure 140 operate in concert to suspend the transducing head 108 a predetermined distance 158 from the recording surface 160 of the data storage medium 138, which can be characterized as the air bearing.

An aperture 162 in the gimbal flexure 140 is spanned by a microactuator feature 144, which can be any material or lamination that responds to electrical signals with predictable physical motion. The position, size, and material construction of the microactuator 144 controls the extent, speed, and orientation of transducing head 108 movement in the X-Y plane, parallel to the recording surface 160, in response to electrical signals from a controller 110. That is, an electrical signal sent to the microactuator 144 via a flex circuit 164 from the controller 110 causes the microactuator 144 to rotate in the X-Y plane about the aperture 162.

When the microactuator 144 and flex circuit 164 are positioned on an air bearing side 166 of the gimbal flexure 140, as shown by solid lines in FIG. 3, a test probe 168 can easily engage different portions of the flex circuit 164 and microactuator 144 after being assembled together. In other words, the probe 168 can physically engage exposed portions of a single side of the flex circuit 164 to test the various electrical traces of the flex circuit 164 for errors, such as open circuits and short circuits. In contrast, when the microactuator 144 is positioned on the load beam side 170 of the gimbal flexure 140, as shown by segmented lines in FIG. 3, the probe 168 cannot easily or accurately engage and test portions of the flex circuit 164, particularly from a single side once the transducing suspension is assembled, due to the microactuator connection pads facing the load beam 142.

The inability to efficiently and accurately test the flex circuit 164 with a single sided probe 168 once a microactuator 144 is assembled on the load beam side 170 of the gimbal flexure 140 limits the structural and electrical configurations of the transducing suspension, which can result in unutilized potential to increase data storage performance of the data storage device 150, such as bit error rate, read latency, and write latency. While components of the data storage device 150 can be tested individually prior to assembly, the efficient testing of the assembled transducing suspension can identify circuit errors due to manufacturing and/or testing of various assembled transducing components.

Figure 4:
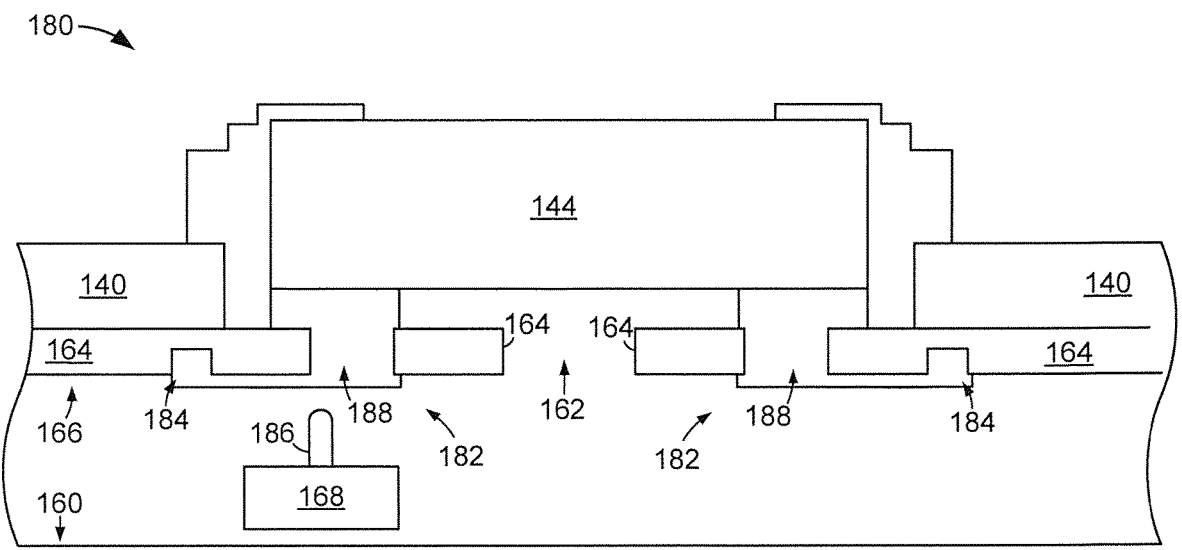
FIG. 4 shows a cross-sectional line representation of portions of an example head gimbal assembly configured in accordance with some embodiments.

FIG. 4 displays a line representation of a portion of an example transducing suspension 180 that can be employed in a data storage device and data storage system in accordance with various embodiments. The transducing suspension 180 has a test via 182 that allows a test probe 168 to electrically test the assorted electrical traces, and independent circuits, of the flex circuit 164 from a single air bearing side 166 of the gimbal flexure 140 even after the microactuator 144 is positioned on the load beam side 170 of the gimbal flexure 140, as shown.

A test via 182 can consist of an electrically conductive material physically connected to at least one electrical circuit of the flex circuit 164. Any number of test vias 182 can be employed at any location on the flex circuit 164 to easily evaluate the flex circuit 164 for electrical errors. Although not required or limiting, various embodiments position a probe portion 184 of the test via 182 aligned with the gimbal flexure 140 to provide a rigid backing for the probe tip 186. That is, the probe portion 184 is aligned with the gimbal flexure 140 along the Z axis so that the probe tip 186 can physically engage the conductive material of the probe portion 184, which is connected to the contact pad 188 of the microactuator 144, without deforming the flex circuit 164, contact pad 188, and/or probe portion 184.

The probe portion 184 may be placed anywhere on the flex circuit 164 with any size and shape. For instance, the probe portion 184 can be recessed below a top surface of the flex circuit 164 on the air bearing side 166. As another non-limiting example, the probe portion 184 may continuously extend into the flex circuit 164 to a depth that is less than the overall depth of the flex circuit. As such, the probe portion 184 would not extend completely through the flex circuit 164 as the contact pad 188 does.

In contrast, engagement of the probe tip 186 with the exposed contact pad 188 would result in damage to the flex circuit 164 and/or contact pad 188. In other words, despite constructing the microactuator contact pad 188 to continuously extend through the flex circuit 164 to be exposed to the probe 168, the physical engagement of the probe tip 186 with the contact pad 188 would damage the flex circuit 164 and/or contact pad 188 due to the force applied by the probe tip 186 along the Z axis to establish reliable electrical contact that allows the probe 168 to accurately test the flex circuit 164.

It is noted that one or more probe portions 184 can separately be incorporated into any trace of the flex circuit 164 to provide an efficient testing location for the probe 168. For instance, the separate test vias 182 shown in FIG. 4 can provide independent, or redundant, testing sites for the probe 168 that can efficiently be engaged after assembly of the transducing suspension 180. As a result, the electrical components of the transducing assembly 180 can be tested for correct structure and function individually before assembly and collectively after assembly.

Figure 5A:
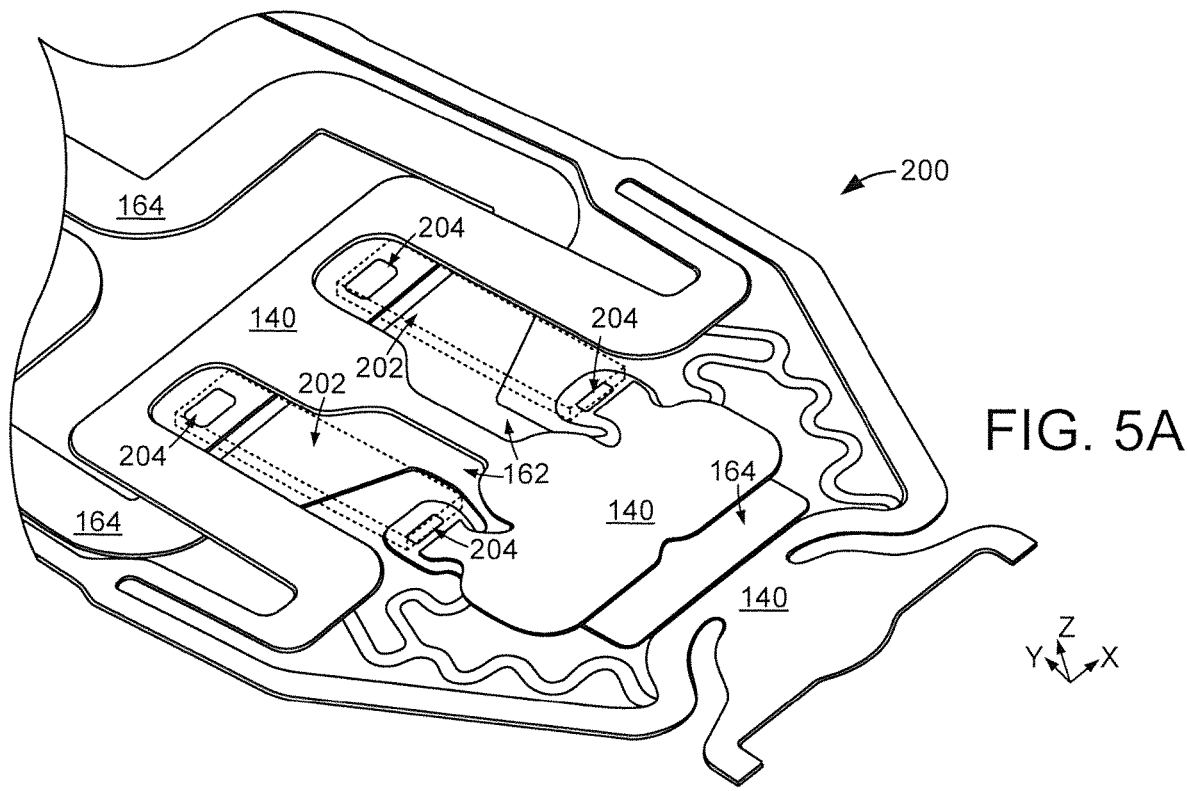
FIGS. 5A and 5B respectively illustrate portions of an example head gimbal assembly capable of being used in the data storage system of FIG. 1.
Figure 5B:
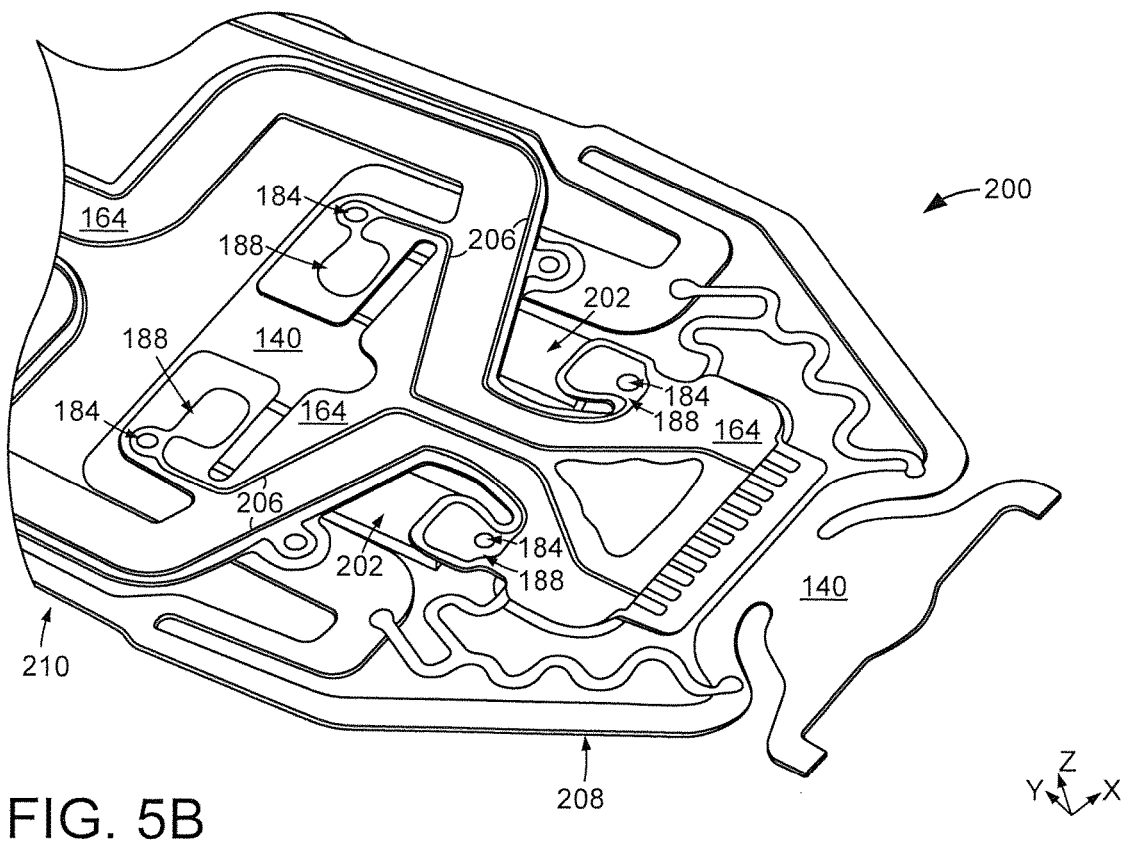

FIGS. 5A and 5B respectively illustrate different views of a portion of an example transducing suspension 200 that can be utilized in a data storage device and data storage system in accordance with some embodiments. The view of FIG. 5A is from a load beam's perspective and conveys how a gimbal flexure 140 can be configured to provide rigid, but flexible, support for a flex circuit 164, microactuator 202, and transducing head 108. The gimbal flexure 140 may be arranged in an unlimited variety of shapes and sizes that provide reliable transducing head 108 positioning despite dynamic forces being applied by the microactuator 202 and/or air bearing above an adjacent data storage medium.

The microactuator 202 is arranged as a pair of separate structures 202 that each span different apertures 162 of the gimbal flexure 140. When the microactuators 202 are positioned on the air bearing side 166 of the gimbal flexure 140, as illustrated in FIG. 5B instead of the load beam side 170 conveyed in FIG. 5A, portions of the microactuator contact pads 204 are exposed to the air bearing and can be physically accessed with a probe. However, positioning the microactuators 202 on the load beam side 170 of the gimbal flexure 140 causes the microactuator contact pads 204 to be obscured from the air bearing and test probe. Hence, various embodiments are directed to configuring a test via 182 that extends from the microactuator contact pad 204 through the flex circuit 164 to a probe portion 184 that allows for efficient probe testing of the assembled transducing suspension 200 from a single air bearing side, as shown in FIG. 4.

The air bearing side 166 view of FIG. 5B conveys how each probe portion 184 is physically separated from, but electrically connected to, a respective test via contact pad 182 by a flex circuit trace 206. The position of the probe portions 184 backed by the gimbal flexure 140, which may be a single layer, or lamination of, stainless steel, aluminum, ceramic, or other rigid material, allows a probe tip to physically contact the probe portion 184 and electrically test the flex circuit 164 for structural errors, like shorted and open traces 206.

It is noted that opposite sides of each microactuator structure 202 are separately connected to the flex circuit 164 and are each arranged with a probe portion 184 aligned along the Z axis with the gimbal flexure 140. It is further noted that the contact pad 188 and test via 182 physical configuration is different on the leading region 208 of the gimbal flexure 140 compared to the trailing region 210 of the gimbal flexure 140. That is, the test vias 182 on the leading portion 208 of the microactuator structures 202 are differently configured compared to the test vias 182 of the trailing portion 210 by having the probe portion 184 being positioned within the areal extent of the contact pads 188. Accordingly, different regions, traces 206, and electrical components connected to the flex circuit 164 can be tested with a probe from the single air bearing side with test vias that have customized shapes, sizes, and orientations of the probe portion 184 to the contact pad 188.

Figure 6:
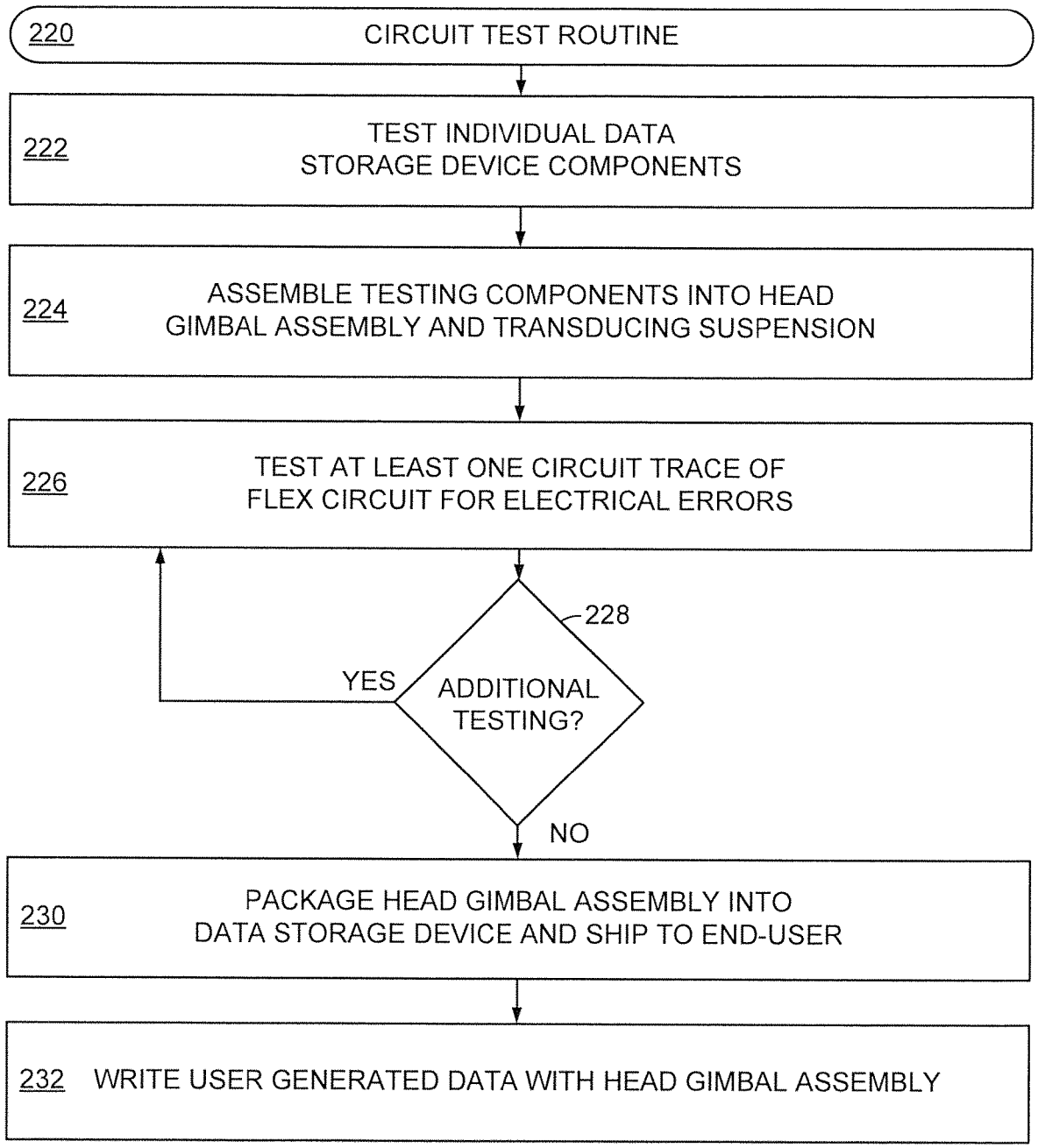
FIG. 6 provides a flowchart of an example circuit test routine that can be carried out by the assorted embodiments of FIGS. 1-5B.

FIG. 6 is a flowchart of an example circuit test routine 220 that can be carried out with the various aspects of FIGS. 1-5B in accordance with some embodiments. The routine 220 can begin during data storage device manufacturing with step 222 testing individual components that are to be assembled into a transducing suspension in step 224. The testing of step 222 can involve all, or less than all, of the electrical components of a transducing suspension, such as a data reader, data writer, flex circuit, microactuator, and heater.

The assembly of the transducing suspension in step 224 positions at least one microactuator structure on a load beam side of a gimbal flexure so that the electrical contact pad of the flex circuit is hidden from the air bearing side of the flex circuit, as mounted to the gimbal flexure. Step 224 further positions test vias in locations on the flex circuit where probe portions are backed by the gimbal flexure and test via contact pads are exposed to the air bearing.

The location and configuration of the test via(s) about the flex circuit in an assembled transducing suspension allows step 226 to test at least one circuit trace of the flex circuit for electrical errors by physically engaging a probe portion with a probe tip from only the air bearing side of the gimbal flexure, as opposed to a two-sided probe that would engage opposite load beam and air bearing sides of the flex circuit. With at least one test via utilized to test the flex circuit and electrically connected transducing suspension components, decision 228 determines if additional electrical tests are to be executed on the assembled transducing suspension.

It additional testing is called for, decision 228 cycles back to step 226 where the test probe physically engages at least one test via to electrically evaluate portions of the transducing assembly. If no additional testing is to be conducted, decision 228 proceeds to step 230 where the transducing assembly is packaged as a data storage device and shipped to an end-user whom utilizes the transducing assembly in step 232 to write user-generated data the data storage medium adjacent the transducing assembly. It is noted that the various aspects of routine 220 are not required or limiting and changes can be made without altering the spirit of the present disclosure. For instance, steps and/or decisions can be incorporated into, or removed from, routine 220 to provide differently configured test vias that are accessed by a probe from a single air bearing side of the transducing assembly to test multiple, perhaps redundant, aspects of the flex circuit and connected electrical components.

Through the various embodiments of FIGS. 1-6, a transducing assembly of a data storage device can be efficiently and accurately tested by a test probe positioned on a single air bearing side of a flex circuit. Configuring a test via to extend from a contact pad facing a load beam side of the flex circuit to a probe portion facing the air bearing side of the flex circuit allows for singe side flex circuit testing despite electrical components, such as microactuator structures, being positioned between the gimbal flexure and load beam. The ability to customize the configuration of test vias to align a probe portion with the rigid gimbal flexure ensures reliable electrical testing during physical contact of a probe tip with the probe portion without damaging the flex circuit, test via, or other portions of the assembled transducing assembly.

What is claimed is:

1. An apparatus comprising:
a gimbal flexure suspended between a load beam and a data storage medium;
a flex circuit physically attached to the gimbal flexure and electrically connecting a transducing head to a controller; and
a test via continuously extending through an aperture in the flex circuit to a probe portion and a test pad located on an air bearing side of the flex circuit, the probe portion backed by the gimbal flexure along a plane perpendicular to a recording surface of the data storage medium, the probe portion separated from the aperture in the flex circuit along an axis parallel to the recording surface of the data storage medium.

2. The apparatus of claim 1, wherein the transducing head comprises a slider supporting a data reader and a data writer on an air bearing side of the gimbal flexure.

3. The apparatus of claim 1, wherein the load beam extends from a voice coil motor.

4. The apparatus of claim 1, wherein the gimbal flexure contacts a dimple protruding from the load beam.

5. The apparatus of claim 1, wherein the probe portion is aligned with a solid surface of the gimbal flexure along the plane perpendicular to the recording surface of the data storage medium.

6. The apparatus of claim 1, wherein the test pad is offset from the gimbal flexure.

7. The apparatus of claim 6, wherein the test pad is not backed by the gimbal flexure and is aligned with the aperture of the gimbal flexure.

8. The apparatus of claim 1, wherein the test pad extends from a first contact pad on a load beam side of the flex circuit to a second contact pad on the air bearing side of the flex circuit.

9. The apparatus of claim 1, wherein the probe portion extends to less than all of a thickness of the flex circuit.

10. The apparatus of claim 1, wherein the probe portion is electrically connected to the test pad.

11. The apparatus of claim 1, wherein the probe portion is recessed below a top surface of the flex circuit on the air bearing side.

12. A system comprising:
a microactuator attached to a gimbal flexure between the gimbal flexure and a load beam;
a flex circuit physically connected to the microactuator and an air bearing side of the gimbal flexure, the flex circuit electrically connecting the microactuator to a controller; and
a first test via continuously extending through an aperture in the flex circuit to a first probe portion and first test pad located on an air bearing side of the flex circuit, the first test via electrically connected to the microactuator, the first probe portion backed by the gimbal flexure along a plane perpendicular to a recording surface of a data storage medium, the first probe portion separated from the aperture in the flex circuit along an axis parallel to the recording surface of the data storage medium.

13. The system of claim 12, wherein the microactuator comprises first and second microactuator structures each electrically connected to the flex circuit at separate trailing and leading regions of the flex circuit.

14. The system of claim 13, wherein the first microactuator structure is connected to the flex circuit by the first test via at the leading region and by a second test via at the trailing region, the second test via comprising a second test pad and a second probe portion.

15. The system of claim 14, wherein the first test via is configured differently than the second test via.

16. The system of claim 14, wherein the second probe region is positioned within an areal extent of the second test pad.

17. The system of claim 12, wherein the first test pad extends through all of a thickness of the flex circuit and the first probe portion extends to less than all of the thickness of the flex circuit.

18. A method comprising:
suspending a gimbal flexure from a load beam;
positioning a flex circuit physically on the gimbal flexure between the gimbal flexure and a data storage medium;
connecting a transducing head to a controller via the flex circuit;
testing the flex circuit with a probe positioned on an air bearing side of the gimbal flexure, the probe contacting a probe portion of a test via of the flex circuit, the test via continuously extending through an aperture in the flex circuit from a first contact pad located on a load beam side of the flex circuit to a second contact pad located on an air bearing side of the flex circuit, the probe portion backed by the gimbal flexure along a plane perpendicular to a recording surface of the data storage medium, the probe portion separated from the aperture in the flex circuit along an axis parallel to the recording surface of the data storage medium.

19. The method of claim 18, wherein the probe tests at least one trace of the flex circuit for electrical errors by physically engaging the probe portion.

20. The method of claim 18, wherein the probe tests the flex circuit only from the air bearing side of the flex circuit after the gimbal flexure is assembled into a transducing suspension with the load beam.

* * * * *